United States Patent
Moore et al.

(10) Patent No.: US 7,478,179 B2
(45) Date of Patent: Jan. 13, 2009

(54) INPUT/OUTPUT PRIORITY INHERITANCE WHEREIN FIRST I/O REQUEST IS EXECUTED BASED ON HIGHER PRIORITY

(75) Inventors: William H. Moore, Fremont, CA (US); Jeffrey S. Bonwick, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 226 days.

(21) Appl. No.: 11/433,345

(22) Filed: May 12, 2006

(65) Prior Publication Data

US 2007/0130387 A1 Jun. 7, 2007

Related U.S. Application Data

(60) Provisional application No. 60/733,380, filed on Nov. 4, 2005.

(51) Int. Cl.
*G06F 3/00* (2006.01)
*G06F 13/00* (2006.01)

(52) U.S. Cl. .............................. 710/40; 710/8; 710/52; 710/53

(58) Field of Classification Search .................. 710/40, 710/8, 52, 53
See application file for complete search history.

(56) References Cited

U.S. PATENT DOCUMENTS

| | | | |
|---|---|---|---|
| 5,761,501 A | 6/1998 | Lubbers et al. | |
| 5,787,482 A | 7/1998 | Chen et al. | |
| 5,812,799 A | 9/1998 | Zuravleff et al. | |
| 5,870,396 A | 2/1999 | Abu-Amara et al. | |
| 5,878,280 A * | 3/1999 | Lucht ........................... | 710/52 |
| 6,023,720 A | 2/2000 | Aref et al. | |
| 6,078,998 A | 6/2000 | Kamel et al. | |
| 6,088,751 A | 7/2000 | Jaramillo | |
| 6,378,036 B2 | 4/2002 | Lerman et al. | |
| 6,502,205 B1 | 12/2002 | Yanai et al. | |
| 6,529,907 B1 | 3/2003 | Terakura et al. | |
| 6,871,011 B1 | 3/2005 | Rahman et al. | |
| 6,925,055 B1 * | 8/2005 | Erimli et al. ................. | 370/229 |
| 6,947,450 B2 | 9/2005 | Mangin et al. | |
| 7,100,074 B2 | 8/2006 | Watanabe et al. | |
| 7,114,156 B2 | 9/2006 | Le et al. | |
| 7,120,159 B2 | 10/2006 | Kumazawa et al. | |
| 2005/0044289 A1 | 2/2005 | Hendel et al. | |

OTHER PUBLICATIONS

Nievergelt, J.; "Binary Search Trees and File Organization"; Computing Surveys, vol. 6, No. 3, Sep. 1974; pp. 195-207 (13 pages).

* cited by examiner

*Primary Examiner*—Tammara Peyton
(74) *Attorney, Agent, or Firm*—Osha • Liang LLP

(57) ABSTRACT

A method for executing input/output (I/O) operations based on priority involves receiving a first I/O request for a unit of data, receiving a second I/O request for the same unit of data, determining a priority of the first I/O request and a priority of the second I/O request, and executing the first I/O request based on priority, where the first I/O request is executed based on the higher of the priority of the first I/O request and the priority of the second I/O request.

15 Claims, 6 Drawing Sheets

INPUT/OUTPUT PRIORITY INHERITANCE WHEREIN FIRST I/O REQUEST IS EXECUTED BASED ON HIGHER PRIORITY

CROSS-REFERENCE TO RELATED APPLICATIONS

This application claims benefit of U.S. Provisional Application Ser. No. 60/733,380 filed on Nov. 4, 2005, entitled "PIPELINED I/O EXECUTION, I/O DEPENDENCY GRAPHS, AND I/O PRIORITY INHERITANCE" in the names of William H. Moore and Jeffrey S. Bonwick.

The present application contains subject matter that may be related to the subject matter in the following U.S. patent applications, which are all assigned to a common assignee: "Method and Apparatus for I/O Scheduling" (application Ser. No. 10/923,633) filed on Aug. 20, 2004; "Method and Apparatus for File System Level I/O Queuing" (application Ser. No. 10/923,632) filed on Aug. 20, 2004; "Method and Apparatus for Quantized Deadline I/O Scheduling" (application Ser. No. 10/922,649) filed on Aug. 20, 2004; "Method and System for I/O Scheduler Activations" (application Ser. No. 11/069,176) filed on Mar. 1, 2005, and "Adaptive Resilvering I/O Scheduling" filed on Apr. 19, 2006.

BACKGROUND

In a computer system, Input/Output, or I/O, is made up of the collection of interfaces that different components (e.g. CPU, keyboard, mouse, monitor, etc.) use to communicate with each other, or the signals sent through these interfaces. Signals received by a component are inputs, and signals sent from it are outputs. Output from one device is often taken as input to another, allowing different devices to be linked. I/O allows a person or other system to communicate with a computer and also allows devices within a computer to communicate with one another.

I/O may also refer to an input or output operation performed by one of these devices. Typical input devices include keyboards and mice, and typical output devices include monitors and printers. Modems and network cards, which provide communications between computers, are generally both input and output devices. Buses connect different computer components and can use the same set of wires to connect several peripherals. I/O is often transferred between devices using buses.

In computer architecture, any movement of information to or from the combination of the CPU and main memory (e.g. data transfer to or from a disk drive) is considered I/O. The CPU and supporting circuitry provide I/O methods that are used in low-level computer programming in the implementation of device drivers.

In operating a computer system, some I/O operations depend on one another. For example, data may have to be written to a device first before it is accessed by another device. Problems may occur if I/O operations are performed out of order. As a result, I/O operations in a system are often executed serially to ensure that they are performed in the right order. Doing so usually results in poor performance, as any multithreaded capabilities are not utilized. However, if dependency relationships between I/Os are known, then some I/Os can be executed in parallel in order to maximize throughput and minimize the overall latency in completing a large number of I/Os.

When I/Os are scheduled by multiple applications, some applications may be more important or vital than others and should have preferential treatment. As a result, I/Os of more important applications should be scheduled earlier and/or more often than I/Os of less important applications. This would allow individual applications to run more smoothly and optimize overall performance in the system.

SUMMARY

In general, in one aspect, the invention relates to a method for executing input/output (I/O) operations based on priority. The method comprises receiving a first I/O request for a unit of data, receiving a second I/O request for the same unit of data, determining a priority of the first I/O request and a priority of the second I/O request, and executing the first I/O request based on priority, wherein the first I/O request is executed based on the higher of the priority of the first I/O request and the priority of the second I/O request.

In general, in one aspect, the invention relates to a system for storing data. The system comprises a storage pool configured to store data, an Input/Output (I/O) queue configured to store an I/O request for data, and a file system configured to receive a first I/O request for a unit of data, receive a second I/O request for the same unit of data, determine a priority of the first I/O request and a priority of the second I/O request, and execute the first I/O request based on priority, wherein the first I/O request is executed based on the higher of the priority of the first I/O request and the priority of the second I/O request.

In general, in one aspect, the invention relates to a method for executing input/output (I/O) operations based on priority. The method comprises receiving a first I/O request, associated with an initial priority of the first I/O request, for a first unit of data and a second unit of data, receiving a second I/O request, associated with a priority of the second I/O request that is higher than the priority of the first I/O request, for the first unit of data and a third unit of data, changing the priority of the first I/O request to the priority of the second I/O request to retrieve the first unit of data, and changing the priority of the first I/O request back to the initial priority of the first I/O request to retrieve the second unit of data.

Other aspects of the invention will be apparent from the following description and the appended claims.

DETAILED DESCRIPTION

Figure 1:
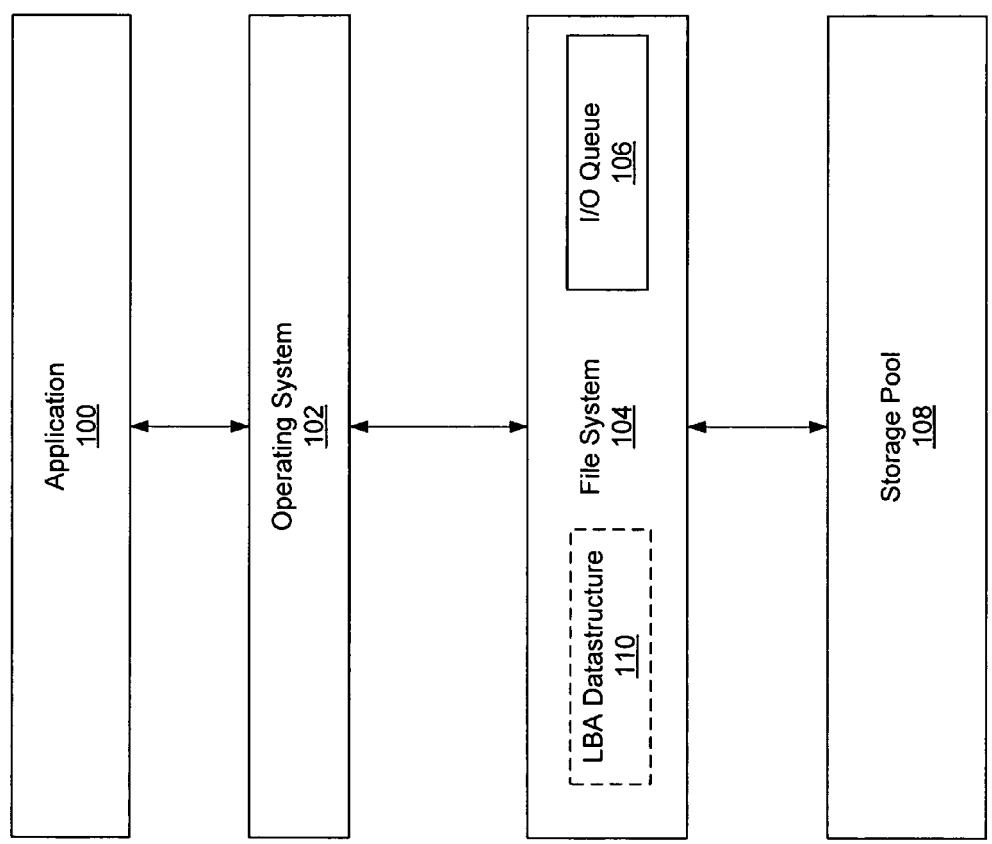
FIG. 1 shows a system architecture in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for executing I/O commands based on priority, which can be inherited by associated I/O commands. Specifically, embodiments of the invention allow both dependencies of an I/O command and other I/O commands that request the same data to inherit its priority. Embodiments of the invention implement I/O priority inheritance using an I/O queue and, in some embodiments of the invention, a logical block address (LBA) data structure.

In one embodiment of the invention, I/O scheduling is provided by giving each outstanding I/O command within a file system a distinct priority, based on a number of factors (e.g., type of operation, the priority of the thread issuing the I/O command, etc.), and then using this priority to drive deadline scheduling within the file system.

In one embodiment of the invention, one I/O command may benefit from a second I/O command's higher priority if the two are associated in some way. For example, when multiple I/O commands request the same block within a file system, the present invention issues one request for the block and assigns the priority of the highest priority I/O command that requests the block to the issued request.

In one embodiment of the invention, I/O command priority is inherited by dependencies of an I/O command. In one or more embodiments of the invention, if an I/O command is waiting on one or more I/O commands (i.e., dependencies) to finish before completing execution itself, the dependencies of the I/O command may inherit its priority so that the I/O can complete in a timely fashion.

FIG. 1 shows a system architecture in accordance with one embodiment of the invention. The system architecture includes an application (100) interfacing with an operating system (102). Further, the operating system (102) includes functionality to interact with a file system (104), which in turn interfaces with a storage pool (108). The operating system (102) typically interfaces with the file system (104) via a system call interface (not shown). The operating system (102) provides operations for users to access files within the file system (104). These operations may include read, write, open, close, etc. In one embodiment of the invention, the file system (104) is an object-based file system (i.e., both data and metadata are stored as objects). More specifically, the file system (104) includes functionality to store both data and corresponding metadata in the storage pool (108). Thus, the aforementioned operations provided by the operating system (102) correspond to operations on objects.

More specifically, in one embodiment of the invention, a request to perform a particular operation (i.e., a transaction) is forwarded from the operating system (102), via the system call interface, to the file system (104). In one embodiment of the invention, the file system (104) translates the request to perform an operation on an object directly to a request to perform a read or write operation (i.e., an I/O request) at a physical location within the storage pool (108). Further, the file system (104) includes functionality to write the data into the storage pool (108).

In accordance with one embodiment of the invention, file system (104) may include an I/O management module (not shown), a compression module (not shown), an encryption module (not shown), a checksum module (not shown), and a metaslab allocator (not shown). Each of these aforementioned modules may be used by the file system (104) to read data from and/or write data to the storage pool (108). Each of the aforementioned modules is detailed below.

In one embodiment of the invention, the I/O management module (not shown) receives I/O requests and groups the I/O requests into transaction groups. The compression module (not shown) provides functionality to compress larger logical blocks into smaller segments, where a segment is a region of physical disk space. Further, in one embodiment of the invention, the encryption module (not shown) provides various data encryption algorithms. The data encryption algorithms may be used, for example, to prevent unauthorized access. In one embodiment of the invention, the checksum module (not shown) includes functionality to calculate a checksum for data and metadata within the storage pool. The checksum may be used, for example, to ensure data has not been corrupted. As discussed above, the file system (104) provides an interface to the storage pool (108) and manages allocation of storage space within the storage pool (108). More specifically, in one embodiment of the invention, the file system (104) uses the metaslab allocator (not shown) to manage the allocation of storage space in the storage pool (108).

In one embodiment of the invention, the storage pool (108) includes one or more physical disks. Further, in one embodiment of the invention, the storage capacity of the storage pool (108) may increase and decrease dynamically as physical disks are added and removed from the storage pool.

In one embodiment of the invention, the file system (104) includes at least one I/O queue (106). Each I/O queue (e.g., I/O queue (106)) is associated with a physical disk in the storage pool (108). Each I/O queue (e.g., I/O queue (106)) typically holds the I/O requests for a particular physical disk within the storage pool (108). Alternatively, there may be one I/O queue (106) for the entire storage pool (108) (or for a portion of the storage pool (108)). In one embodiment of the invention, the file system (104) includes functionality to order the I/O requests in each of the I/O queues (e.g., I/O queue (106)). In one or more embodiments of the invention, the file system (104) may also include functionality to reorder the I/O requests in an I/O queue (e.g., I/O queue (106)) based on the dependencies of pending I/Os. The ordering of the I/O requests within the I/O queue (106) is described in FIG. 4 below.

In one embodiment of the invention, the file system (104) may also include a LBA data structure (110). The LBA data structure (110) includes functionality to store the I/O requests in LBA order. In one embodiment of the invention, the LBA data structure (110) is implemented as an AVL tree. Alternatively, the LBA data structure (110) may be implemented using any other suitable data structure (e.g. an array, a linked list, a hash table, etc.). Further, the file system (104) may include functionality to insert I/O requests into the LBA data structure (110) and functionality to retrieve I/O requests using LBAs.

Figure 2:
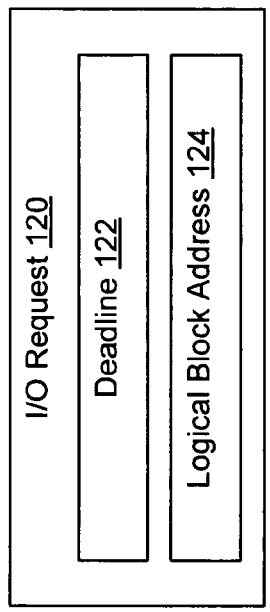
FIG. 2 shows an I/O request in accordance with one embodiment of the invention.

FIG. 2 shows an I/O request in accordance with one embodiment of the invention. The I/O request (120) includes a deadline (122) and a logical block address (LBA) (124). The deadline (122) may correspond to an actual deadline (e.g., a time by which a the I/O request must be issued, or a time frame during which the I/O request must be issued). Alternatively, the deadline (122) may correspond to priority such as: high priority (i.e., complete as soon as possible—may be used with I/O requests from real-time applications as well as synchronous requests), medium priority (i.e., complete soon, but not necessarily immediately—may be used with high priority asynchronous requests), or low priority (i.e., complete eventually—may be used with low priority asynchronous requests such as prefetches). In one embodiment of the invention, the LBA (124) is an n-bit value that maps to a specific location on the physical disk.

Figure 3:
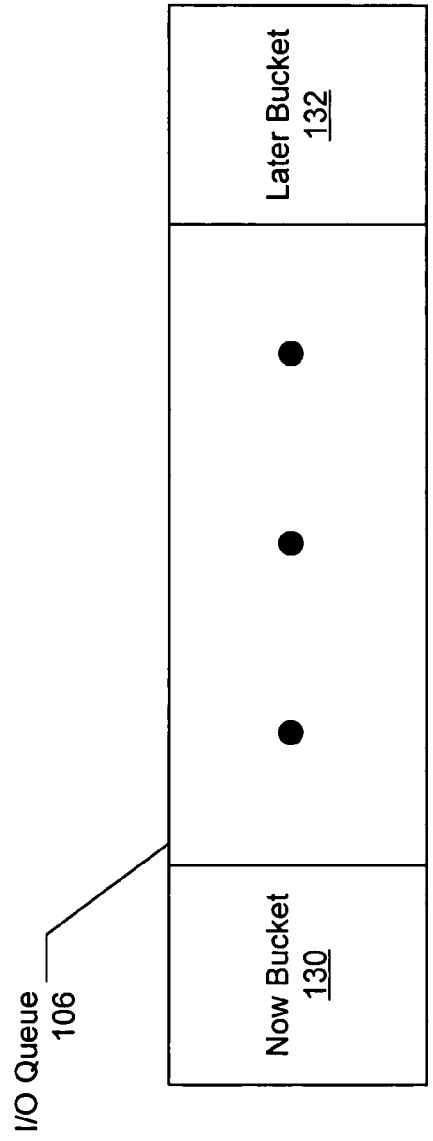
FIG. 3 shows an I/O queue in accordance with one embodiment of the invention.

FIG. 3 shows an I/O queue in accordance with one embodiment of the invention. The I/O queue (106) may include a number of buckets (e.g., a "now" bucket (130) and a "later" bucket (132)). In one embodiment of the invention, each bucket (e.g., the "now" bucket (130) and the "later" bucket (132)) corresponds to a particular priority (described below in FIG. 4). Thus, all I/O requests with a given priority are stored in a particular bucket. Further, the I/O requests within an individual bucket (e.g., the "now" bucket (130) and the "later" bucket (132)) are ordered with respect to LBA (124 in FIG. 2).

As stated above, in one embodiment of the invention, the I/O queue (106) is implemented as an AVL (Adelson Velskii Landis) tree. The AVL tree corresponds to a partially-balanced binary tree. In one embodiment of the invention, the nodes (i.e., the I/O requests) within the AVL tree are ordered using the priority and LBA corresponding to the nodes. If an AVL tree is used to implement the I/O queue (106), then the buckets (e.g., the "now" bucket (130), the "later" bucket (132)) correspond to portions of the AVL tree. In another embodiment of the invention, the I/O queue (106) is implemented as a hash table having hash buckets. Those skilled in the art will appreciate that the I/O queue (106) may be implemented using any data structure that can maintain the order of the I/O requests.

Figure 4:
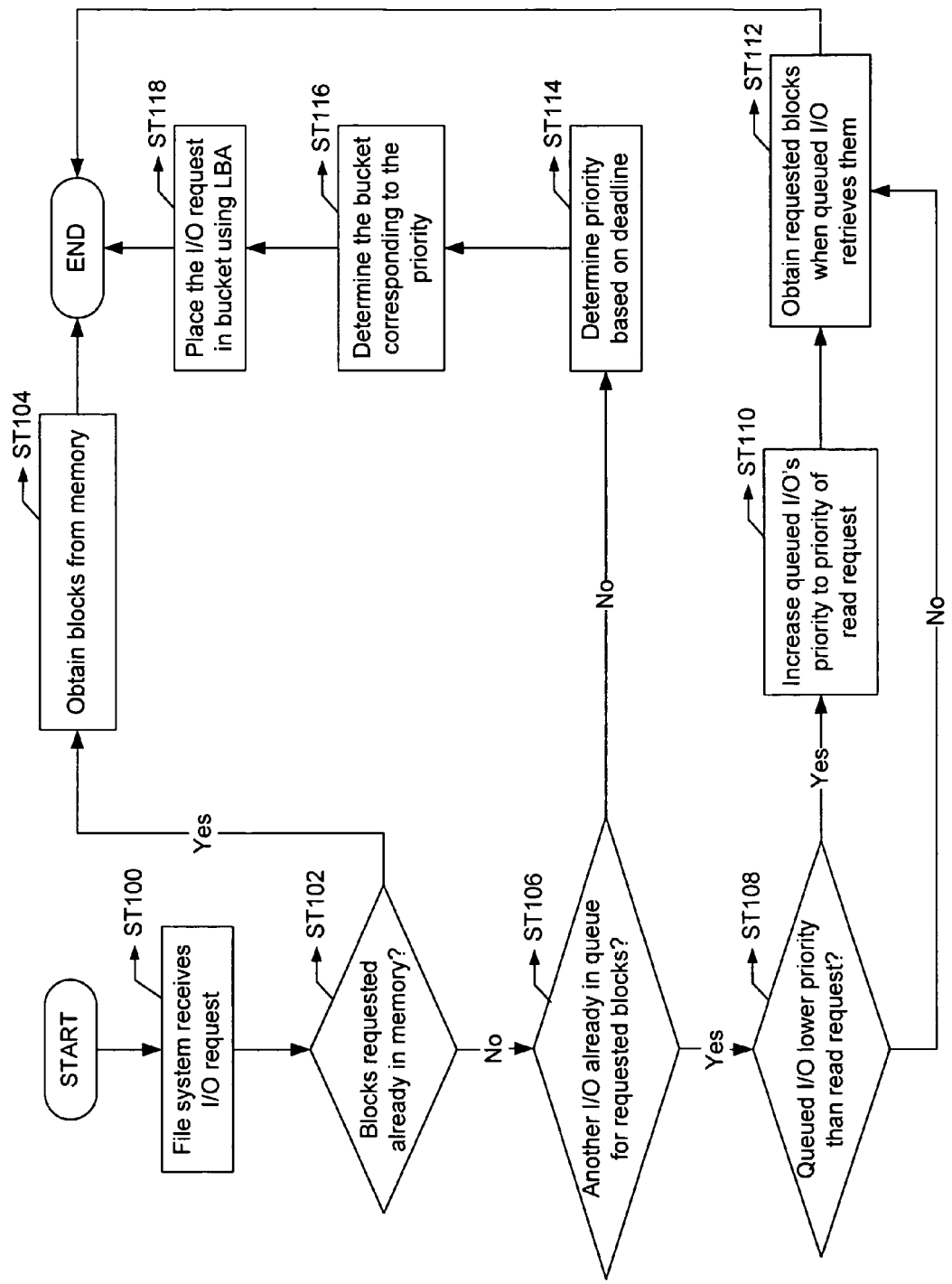
FIGS. 4-6 show flowcharts in accordance with one embodiment of the invention.
Figure 5:
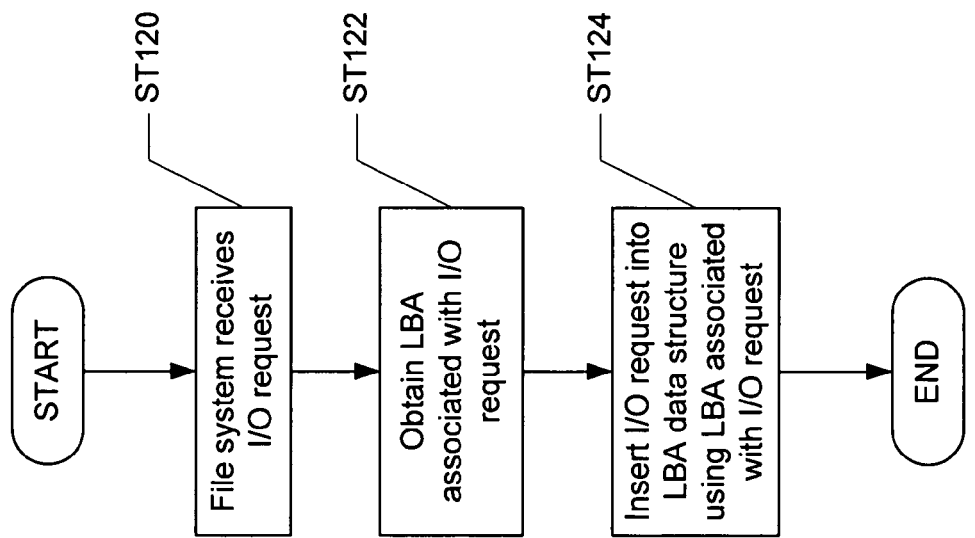
Figure 6:
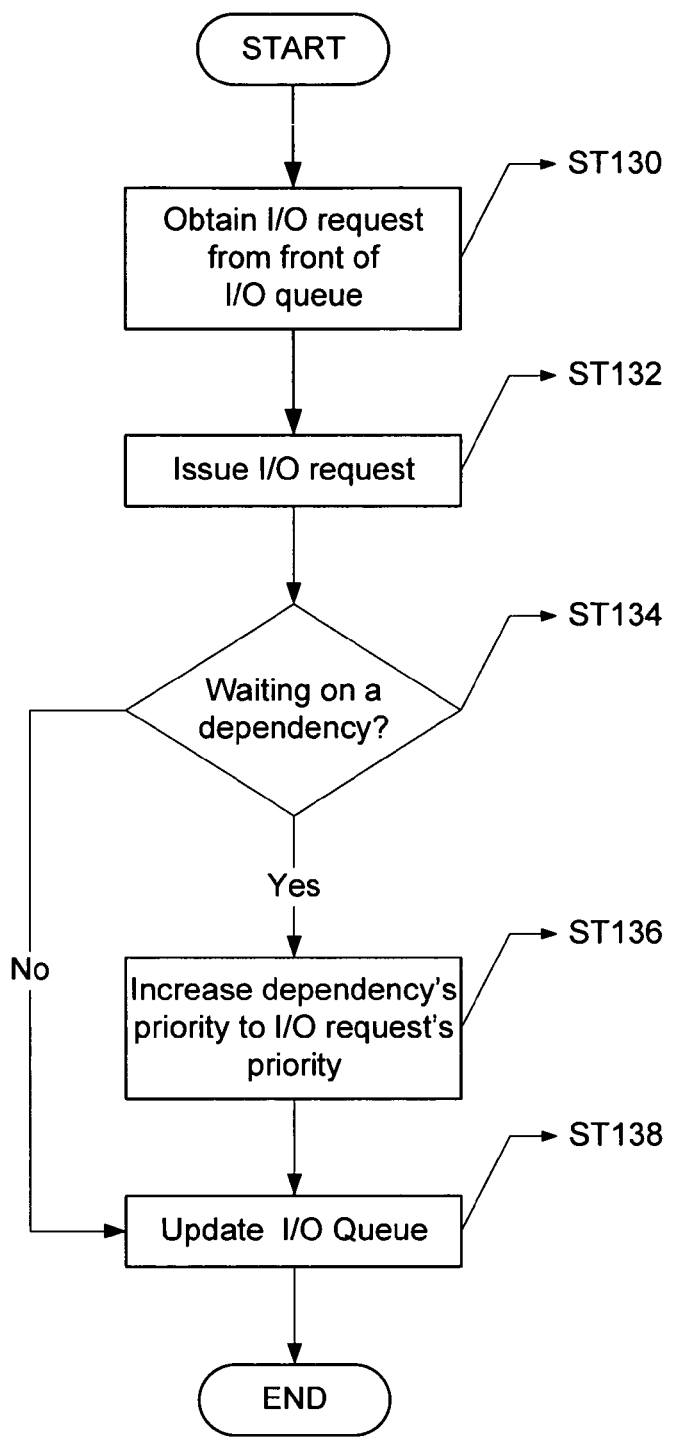

FIGS. 4, 5, and 6 show flowcharts in accordance with one embodiment of the invention. FIG. 4 shows a flowchart for placing a file system I/O request in an I/O queue in accordance with one embodiment of the invention. Initially, an I/O request is received by the file system (ST100). A determination is then made about whether the blocks requested by the I/O request are already stored in memory (ST102). For example, the blocks requested may be stored in memory because a previous I/O request retrieved them. If the requested blocks are stored in memory, then the requested blocks can be obtained from memory without accessing the file system (ST104). Those skilled in the art will appreciate that a file system block is a unit of data, and that I/O requests may use any arbitrarily defined unit of data, such as a bit, a byte, a file, a disk sector, etc. For example, four file system blocks may be considered as one unit of data of four blocks, two units of data of two blocks each, or four units of data of one block each. Multiple I/O requests for the same unit of data may exist even if the I/O requests do not retrieve identical portions of data. As an example, one I/O request is for blocks 1, 2, and 3, and another I/O request would like blocks 2, 4, and 6. As a result, multiple requests exist for block 2, even though the other blocks requested are different for each I/O request.

If the requested blocks are not found in memory, a check is made to see if another I/O request for the blocks is already in the queue (ST106). If not, then the priority of the I/O request is determined based on the deadline (ST114). In one embodiment of the invention, the priority is analogous to a quantized deadline, which corresponds to a period of time when a particular request is to be performed. The quantized deadline is used to coarsely order the I/O request in the I/O queue. In one embodiment of the invention, the quantized deadlines are set in millisecond intervals.

For example, consider the following quantized deadlines: now (0-99 ms), soon (100-199 ms), and later (199 ms+). Thus, when an I/O request having a deadline of 75 ms is received, then the quantized deadline for the I/O request is considered "now". Note that the quantized deadlines may be set using any magnitude (e.g., seconds, milliseconds, nanoseconds, etc.) and any duration of time interval. Further, the quantized deadlines may be identified using any type of label. In one embodiment of the invention, the intervals of the quantized deadlines may be adjusted such that the buckets corresponding to the quantized deadline contain only (or slightly more than) the number of I/O requests that may be processed prior to the I/O requests in the bucket expiring.

Once the priority for the I/O request is determined, the bucket corresponding to the priority deadline is determined (ST116). In one embodiment of the invention, if the I/O queue is implemented as an AVL tree, then determining the bucket corresponding to the priority includes identifying the portion of the AVL tree that corresponds to the bucket. Alternatively, if the I/O queue is implemented as a hash table having hash buckets, then determining the bucket corresponding to the priority includes identifying the appropriate hash bucket.

Once the corresponding bucket is determined, the I/O request is placed in the bucket in an order determined by the LBA of the I/O request (ST118). In one embodiment of the invention, the LBA of the I/O request that is being inserted into the I/O queue is compared with the LBAs of the I/O requests already in the bucket, and then inserted into the appropriate location within the bucket. The insertion of the I/O request into the I/O queue includes inserting the I/O request into the appropriate location in the data structure implementing the I/O queue (e.g., a linked list, an array, an AVL tree, etc).

If another I/O request for the blocks is found in the queue, the I/O request may benefit from the queued I/O request's priority, or vice versa. To determine which I/O request's priority should be inherited, a check is made to see if the queued I/O request has a lower priority than the received I/O request. If not, no further action is taken and the I/O request will receive the requested blocks when the queued I/O retrieves them (ST112).

However, if the queued I/O does contain a lower priority than the I/O request, the priority of the queued I/O is increased to the priority of the I/O request (ST110), and once again, both I/O requests obtain their requested blocks when the queued I/O retrieves them. In one or more embodiments of the invention, a higher priority is inherited by the queued I/O only for the blocks common to both I/O requests. For example, if a queued I/O requests blocks 10, 11, and 12 and a received I/O request with higher priority would like to obtain blocks 11, 13, and 15, the queued I/O would temporarily inherit the received I/O request's higher priority for block 11, but would lose the higher priority once block 11 was retrieved.

FIG. 5 shows a flowchart for placing an I/O request in a LBA data structure. Initially, the file system receives the I/O request (ST120). The LBA of the I/O request is subsequently obtained (ST122). The file system (or a related process) subsequently inserts a copy of the I/O request into the LBA data structure in the appropriate location using the LBA of the I/O request (ST124).

If the embodiment shown in FIG. 5 is implemented, then the methods shown in FIGS. 4 and 5 are both performed every time an I/O request is received by the file system. Further, the method shown in FIGS. 4 and 5 may be performed sequentially or concurrently when the I/O request is received. Upon the completion of the methods shown in FIGS. 4 and 5, a copy of the I/O request is present in both the I/O queue and the LBA data structure.

FIG. 6 shows a flowchart for processing the I/O request in the I/O queue in accordance with one embodiment of the invention. Initially, the highest priority I/O request is obtained from the I/O queue (ST130). In one embodiment of the invention, the highest priority request corresponds to the I/O request in the "now" bucket with the highest priority based on LBA. If the I/O queue is implemented as an AVL tree, then the highest priority I/O request is the I/O request at the left-most leaf of the AVL tree.

Once the highest priority I/O request has been determined, the highest priority I/O request is issued to the appropriate storage device (e.g., physical disks) (ST132). Next, a determination is made as to whether the I/O request is waiting in a dependency (ST134). If the I/O request has completed without waiting on a dependency, the I/O request is removed from the I/O queue (ST138).

In one or more embodiments of the invention, a dependency of an I/O request is referred to as a child, while the I/O request is referred to as a parent. A parent I/O request cannot finish until all of its children have completed execution. As a result, a high-priority parent I/O request may be held back by a low-priority child I/O request and may not make its deadline for execution. For example, a real-time synchronous read may be waiting on a low-priority, asynchronous prefetch of a block to complete before the real-time read can complete.

If the I/O request is waiting on a dependency, the dependency's priority is increased to match the I/O request's priority (ST136). In one or more embodiments of the invention, the queue is then updated (ST138) by moving the dependency to the front of the queue, allowing the dependency to finish execution quickly and the I/O request to be done as well. In one embodiment of the invention, the I/O queue is further updated by removing the I/O request from the front and moving one or more I/O requests from a bucket at the back of the I/O queue to a bucket closer to the front of the I/O queue (e.g., from the "later" bucket to the "now" bucket). Alternatively, if the I/O queue is implemented as an AVL tree, then I/O queue is updated by rebalancing the AVL tree. The LBA data structure is updated in a similar manner.

Those skilled in the art will appreciate that methods described in FIGS. 4, 5, and 6 may occur concurrently within the system. As such, when new I/O requests are received by the file system, the file system places the I/O request in the I/O queue and the LBA data structure (if this embodiment is implemented), thereby reordering the I/O queue and the LBA data structure (if this embodiment is implemented). As noted above, the intervals of the priorities may be adjusted such that the buckets corresponding to the priorities contain only (or slightly more than) the number of I/O requests that may be processed prior to the expiration of the deadlines of the I/O requests in the bucket.

However, in some situations, all of the I/O requests in the bucket may not be able to be processed prior to the expiration of the deadlines of the I/O requests. In such situations, in order to ensure that the I/O requests with expired deadlines are not preempted by other newly arriving high priority I/O requests, the unprocessed I/O requests (typically unprocessed I/O requests from the "now" bucket) are placed in an "immediate" bucket. The "immediate" bucket (not shown in FIG. 3) corresponds to a bucket that has a higher priority than the "now" bucket. Further, an I/O request may not be initially placed in the "immediate" bucket, rather, the I/O request may only move to the "immediate" bucket if the I/O request was previously in the "now" bucket and unprocessed while the I/O request's deadline expired. Further, when new I/O requests are received by the file system, the new I/O requests may only be placed in buckets with less priority than the "immediate" bucket (i.e., in the "now" bucket, the "later" bucket, etc.). In this manner, the I/O requests with expired deadlines are processed.

Those skilled in the art will appreciate that while the aforementioned discussion of embodiments of the invention described a file system that functions without a volume manager, the invention may be implemented on a system architecture with a volume manager. Those skilled in the art will appreciate that while the above discussion of the embodiments of the invention used LBA to order the I/O requests within the corresponding buckets, the I/O request may be ordered using any criteria that minimizes latency or satisfies other performance requirements. The criteria may include information about disk geometry, other characteristics of the disk, etc.

Embodiments of the invention have one or more of the following advantages. Embodiments of the invention allow prioritization without slowing down the file system. Further, embodiments of the invention allow associated I/O requests to inherit the highest priority amongst the associated I/O requests, and by allowing dependencies of an I/O request to inherit the I/O request's higher priority if the I/O request is waiting.

Figure 7:
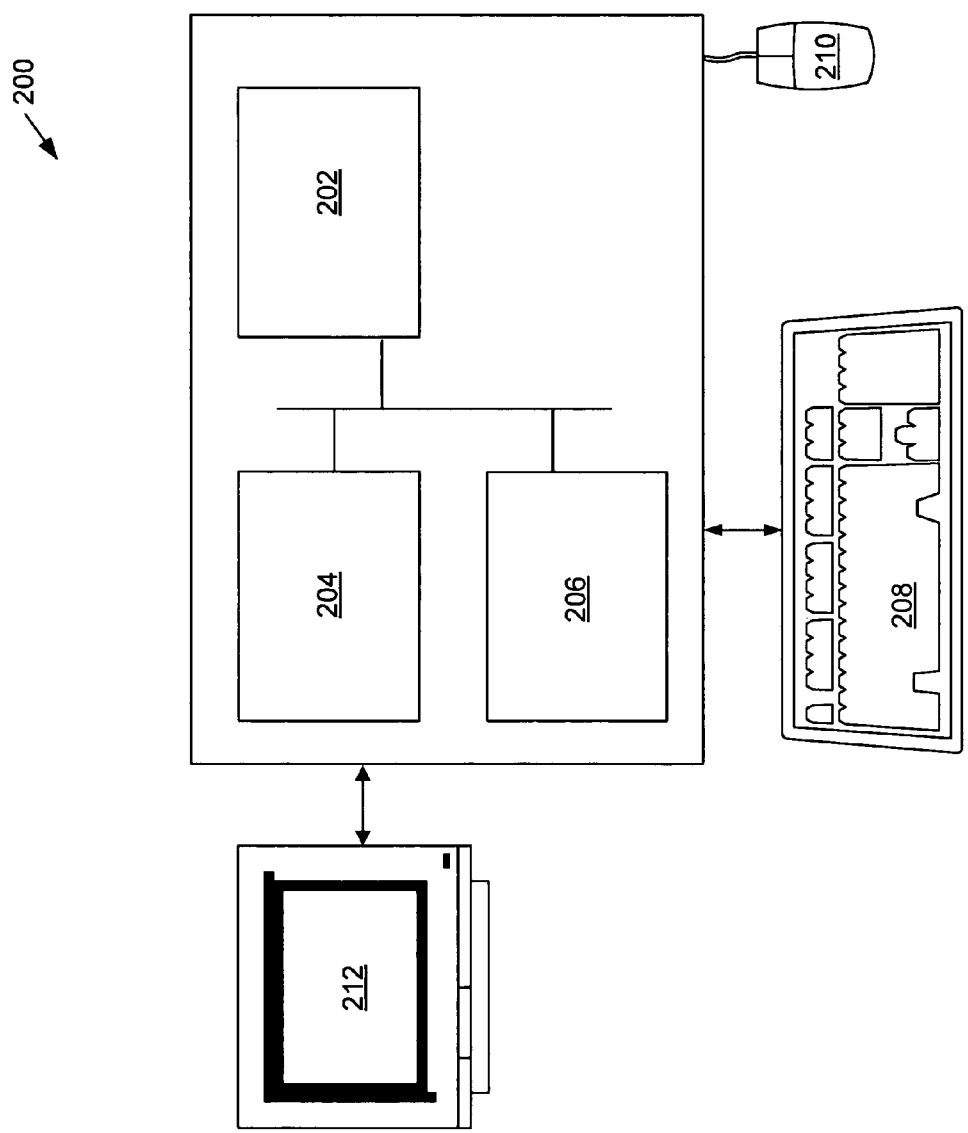
FIG. 7 shows a computer system in accordance with one embodiment of the invention.

The invention may be implemented on virtually any type of computer regardless of the platform being used. For example, as shown in FIG. 7, a computer system (200) includes a processor (202), associated memory (204), a storage device (206), and numerous other elements and functionalities typical of today's computers (not shown). The computer (200) may also include input means, such as a keyboard (208) and a mouse (210), and output means, such as a monitor (212). The computer system (200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., file system, storage pool, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing input/output (I/O) operations based on priority, comprising:
   receiving a first I/O request for a unit of data;
   receiving a second I/O request for the same unit of data;
   determining a priority of the first I/O request and a priority of the second I/O request; and
   executing the first I/O request based on priority,
   wherein the first I/O request is executed based on the higher of the priority of the first I/O request and the priority of the second I/O request,
   wherein the first I/O inquest is placed in an I/O queue based on the priority of the first I/O request,
   wherein the I/O queue comprises a plurality of buckets,
   wherein the plurality of buckets comprises a "now" bucket and a "later" bucket, and wherein the I/O request moves from the "later" bucket to the "now" bucket after a pre-defined amount of time has elapsed.

2. The method of claim 1, further comprising:
increasing the priority of the first I/O request to the priority of the parent of the first I/O request, if the priority of the parent of the first I/O request is higher than the priority of the first I/O request and is waiting for the first I/O request to complete execution.

3. The method of claim 1, wherein the first I/O request and the second I/O request obtain the unit of data when the first I/O request is executed.

4. The method of claim 3, wherein the priority of the first request is decreased when the unit of data is obtained.

5. The method of claim 1, wherein one of the plurality of buckets corresponds to a priority.

6. The method of claim 1, wherein the first I/O request is issued when the request is a highest priority I/O request in the "now" bucket.

7. The method of claim 1, wherein the I/O queue is associated with a file system.

8. A system for storing data, comprising:
a storage pool configured to store data;
an Input/Output (I/O) queue configured to store an I/O request for data; and
a file system configured to:
receive a first I/O request for a unit of data;
receive a second I/O request for the same unit of data;
determine a priority of the first I/O request and a priority of the second I/O request; and
execute the first I/O request based on priority,
wherein the first I/O request is executed based on the higher of the priority of the first I/O request and the priority of the second I/O request,
wherein the first I/O request is placed in an I/O queue based on the priority of the first I/O request,
wherein the I/O queue comprises a plurality of buckets,
wherein the plurality of buckets comprises a "now" bucket and a "later" bucket, and
wherein the I/O request moves from the "later" bucket to the "now" bucket after a pre-defined amount of time has elapsed.

9. The system of claim 8, the file system further configured to:
increase the priority of the first I/O request to a priority of a parent of the first I/O request, if the priority of the parent of the first I/O request is higher than the priority of the first I/O request and the parent of the first I/O request is waiting for the first I/O request to complete execution.

10. The system of claim 9, wherein the first I/O request is moved up in the I/O queue when the parent is waiting on the first I/O request to complete.

11. The system of claim 9, wherein the file system is further configured to update the I/O queue after the first I/O request has been issued to the storage pool.

12. The system of claim 11, wherein updating the I/O queue comprises removing the first I/O request from the I/O queue.

13. A method for executing input/output (I/O) operations based on priority, comprising:
receiving a first I/O request, associated with an initial priority of the first I/O request, for a first unit of data and a second unit of data;
receiving a second I/O request, associated with a priority of the second I/O request that is higher than the priority of the first I/O request, for the first unit of data and a third unit of data;
changing the priority of the first I/O request to the priority of the second I/O request to retrieve the first unit of data; and
changing the priority of the first I/O request back to the initial priority of the first I/O request to retrieve the second unit of data.

14. The method of claim 13, wherein the first I/O request and the second I/O request obtain the first unit of data when the first I/O request is executed.

15. The method of claim 13, wherein the second I/O request retrieves the third unit of data based on the priority of the second I/O request.

* * * * *